(12) United States Patent
Zhang

(10) Patent No.: US 9,131,813 B2
(45) Date of Patent: Sep. 15, 2015

(54) LAMINAR TOILET LID WITH DISPLAY CAVITY

(75) Inventor: Jie Zhang, Allen, TX (US)

(73) Assignee: TOPSEAT INTERNATIONAL, INC., Plano, TX (US)

( * ) Notice: Subject to any disclaimer, the term of this patent is extended or adjusted under 35 U.S.C. 154(b) by 487 days.

(21) Appl. No.: 13/090,883

(22) Filed: Apr. 20, 2011

(65) Prior Publication Data
US 2012/0266371 A1    Oct. 25, 2012

(51) Int. Cl.
| | |
|---|---|
| *A47K 13/14* | (2006.01) |
| *A47K 13/24* | (2006.01) |
| *B32B 21/00* | (2006.01) |
| *B32B 37/18* | (2006.01) |
| *B29C 39/10* | (2006.01) |
| B29L 31/00 | (2006.01) |
| B32B 37/12 | (2006.01) |

(52) U.S. Cl.
CPC .............. *A47K 13/24* (2013.01); *B29C 39/10* (2013.01); *B32B 21/00* (2013.01); *B32B 37/185* (2013.01); *B29L 2031/7694* (2013.01); *B32B 37/12* (2013.01); *B32B 2309/105* (2013.01); *B32B 2317/16* (2013.01); *B32B 2479/00* (2013.01); *Y10T 156/10* (2015.01)

(58) Field of Classification Search
CPC ...................................................... A47K 13/24
USPC ................................................. 4/234, 242.1
See application file for complete search history.

(56) References Cited

U.S. PATENT DOCUMENTS

| | | | | |
|---|---|---|---|---|
| 3,484,876 | A | * | 12/1969 | Thomas Anna Belle ......... 4/234 |
| 5,706,528 | A | | 1/1998 | Broback |
| 5,754,984 | A | * | 5/1998 | Bermudez-Schmeelk .... 4/242.1 |
| 6,959,458 | B1 | | 11/2005 | Tsai |
| 7,621,850 | B2 | * | 11/2009 | Piaget et al. ..................... 482/54 |
| 7,797,767 | B2 | * | 9/2010 | Benkhardt et al. ................ 4/234 |
| 2003/0121090 | A1 | * | 7/2003 | Cecchin ........................... 4/234 |
| 2004/0098795 | A1 | | 5/2004 | Benkhardt et al. |
| 2005/0120469 | A1 | * | 6/2005 | Benkhardt et al. ............. 4/242.1 |
| 2006/0272079 | A1 | | 12/2006 | Alegria |
| 2007/0294821 | A1 | | 12/2007 | Griner |
| 2007/0298229 | A1 | | 12/2007 | Rasmusson et al. |

FOREIGN PATENT DOCUMENTS

| | | |
|---|---|---|
| CN | 2689877 Y | 4/2005 |
| CN | 201631101 U | 11/2010 |
| GB | 2 380 444 A | 4/2003 |

OTHER PUBLICATIONS

Examiner.com "How to make a shadow box display case" Jan. 7, 2010.*

(Continued)

*Primary Examiner* — Paul R Durand
*Assistant Examiner* — Christine Skubinna

(57) ABSTRACT

Embodiments of the present disclosure include a laminate toilet lid with display cavity and a method of manufacturing thereof. The toilet lid includes a core structural layer having an aperture through a middle portion and having a shape and size associated with the toilet lid. The toilet lid also includes a first exterior layer disposed on a first surface of the core structural layer and configured to cover the aperture. The toilet lid further includes a second exterior layer disposed on a second surface of the core structural layer opposite the first decorative graphic layer, the second exterior layer configured to cover the aperture such that the first and second exterior layers enclose the aperture to form a cavity.

14 Claims, 4 Drawing Sheets

(56) References Cited

OTHER PUBLICATIONS

Notification of Transmittal of the International Search Report and the Written Opinion of the International Searching Authority, or the Declaration dated Jul. 5, 2012 in connection with International Patent Application No. PCT/US2012/034252.
Extended European Search Report dated Sep. 4, 2014 in connection with European Patent Application Serial No. 12774191.6; 7 pages.

\* cited by examiner

LAMINAR TOILET LID WITH DISPLAY CAVITY

TECHNICAL FIELD

This disclosure is generally directed to toilets and more particularly to a toilet lid that is formed of a laminar composite material and includes a cavity to display one or more objects.

BACKGROUND

Toilets and toilet lids have existed in various forms for many decades. A toilet lid provides a protective cover for the toilet facility and prevents objects from accidentally falling into the toilet. Generally, toilet lids are made of wood or plastic materials and are solid. Most toilet lids have plain, unadorned surfaces that do not include any type of decoration or permit any artistic expression. Some conventional toilet lids have surfaces that are adorned with silk-screen printing, hand painting, water-transfer printing, heat transfer printing, and the like. However, the surfaces of these toilet lids, like plain toilet lids, can wear, chip off, degrade, or otherwise become damaged over time.

SUMMARY

According to one embodiment of the present disclosure, a laminar display apparatus includes a core structural layer having an aperture through a middle portion. The apparatus also includes a first exterior layer disposed on a first surface of the core structural layer and configured to cover the aperture. The apparatus further includes a second exterior layer disposed on a second surface of the core structural layer opposite the first decorative graphic layer, the second exterior layer configured to cover the aperture such that the first and second exterior layers enclose the aperture to form a cavity.

In another embodiment, a toilet lid includes a core structural layer having an aperture through a middle portion and having a shape and size associated with the toilet lid. The toilet lid also includes a first exterior layer disposed on a first surface of the core structural layer and configured to cover the aperture. The toilet lid further includes a second exterior layer disposed on a second surface of the core structural layer opposite the first decorative graphic layer, the second exterior layer configured to cover the aperture such that the first and second exterior layers enclose the aperture to form a cavity.

In yet another embodiment, a method of manufacturing a toilet lid includes providing a core structural layer of the toilet lid, the core structural layer having an aperture through a middle portion and having a shape and size associated with the toilet lid. The method also includes applying a first exterior layer to a first surface of the core structural layer thereby covering the aperture. The method further includes applying a second exterior layer to a second surface of the core structural layer opposite the first decorative graphic layer, thereby covering the aperture such that the first and second exterior layers enclose the aperture to form a cavity.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure provides a laminar toilet lid that includes a transparent top and a cavity configured to display one or more decorative or aesthetic objects. The toilet lid according to this disclosure offers many advantages. The toilet lid may be customized to display one or more objects to convey a message or impression that may be of interest to a user. In addition, the toilet lid according to this disclosure is constructed to be more durable and retain its original appearance for a longer period than conventional toilet lids.

The laminar toilet lid according to embodiments of this disclosure is constructed with three (3) layers of material: a core structural layer having an opening through a middle portion, a bottom layer disposed on a bottom side of the core structural layer, and a clear top layer disposed on a top side of the core structural layer. One or more objects may be placed in the cavity formed by the opening and the top and bottom layers. All of the layers are integrated together to form a durable, attractive product.

Figure 1:
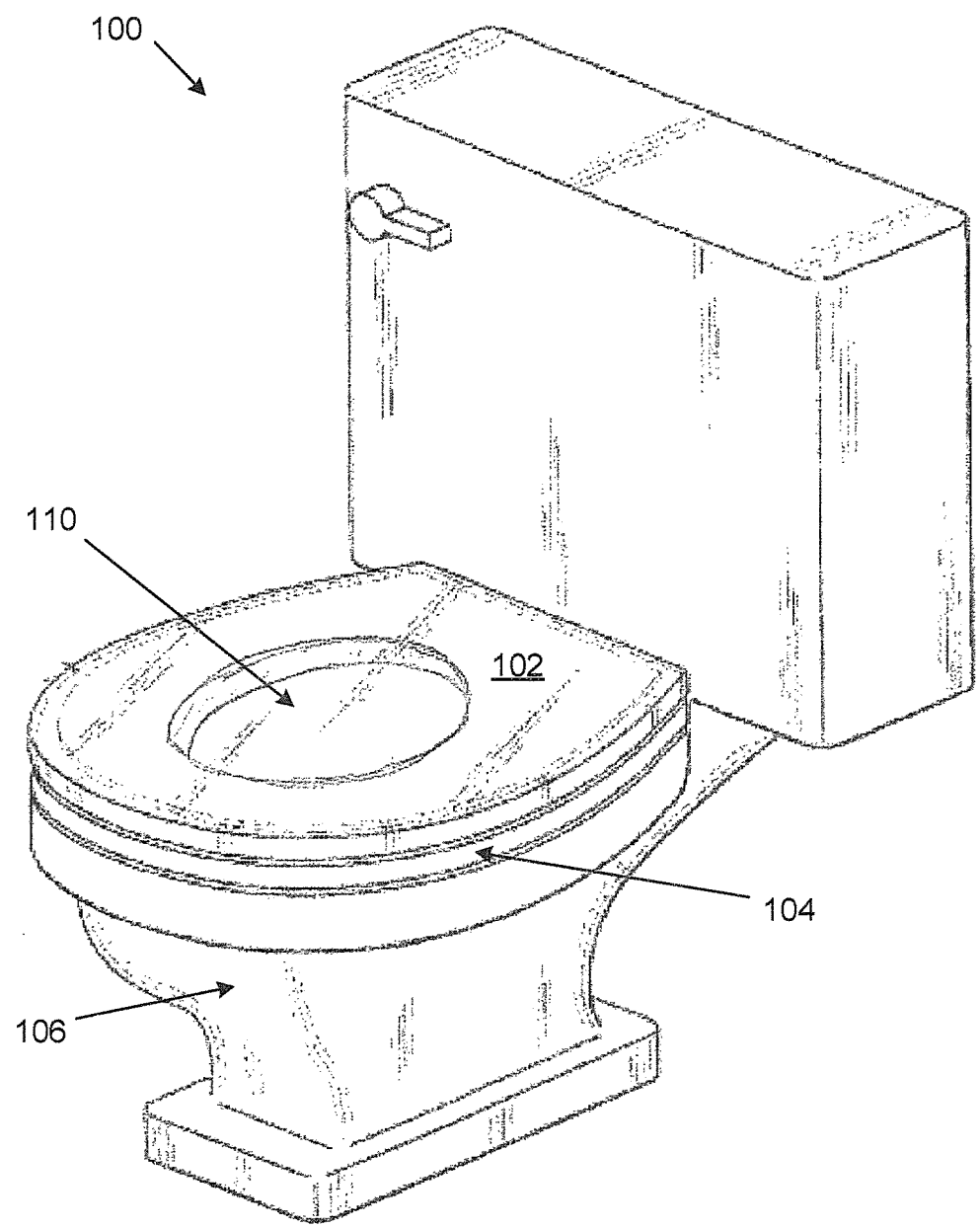
FIG. 1 illustrates a toilet that includes a laminar toilet lid having a display cavity, according to one embodiment of the present disclosure.

FIG. 1 illustrates a toilet that includes a laminar toilet lid having a display cavity, according to one embodiment of the present disclosure. The embodiment of the toilet shown in FIG. 1 is for illustration only. Other embodiments of the toilet could be used without departing from the scope of this disclosure.

As shown in FIG. 1, a toilet 100 is fitted with a toilet lid 102 and toilet seat 104 over a bowl 106. The toilet 100 may be any suitable toilet with a bowl that is configured to be covered by a seat and lid. The bowl 106 has an opening that is generally round or oval in shape. The toilet lid 102 and toilet seat 104 have an overall size and shape configured to generally match the size and shape of the bowl 106 and to cover the opening of the bowl 106. The toilet lid 102 and toilet seat 104 attach to a rear portion of the bowl 106 or toilet 100 using hinged hardware that allow the toilet lid 102 and toilet seat 104 to raise and lower independently with respect to the bowl 106 and to each other, as is known in the art.

In accordance with the present disclosure, the toilet lid 102 includes a cavity 110 disposed in a middle portion of the toilet lid 102. The cavity 110 is generally round or oval in shape and is enclosed by a top layer and a bottom layer of the toilet lid 102, as described in greater detail below. The cavity 110 is configured to accommodate one or more aesthetic or decorative objects.

Although FIG. 1 depicts one example of a toilet 100 with a toilet lid 102, various changes may be made to FIG. 1. For example, while the cavity 110 is depicted as generally round or oval in shape, the cavity 110 could include other shapes, such as a rectangle or octagon. Likewise, the toilet lid 102 could include more than one cavity 110.

Figure 2:
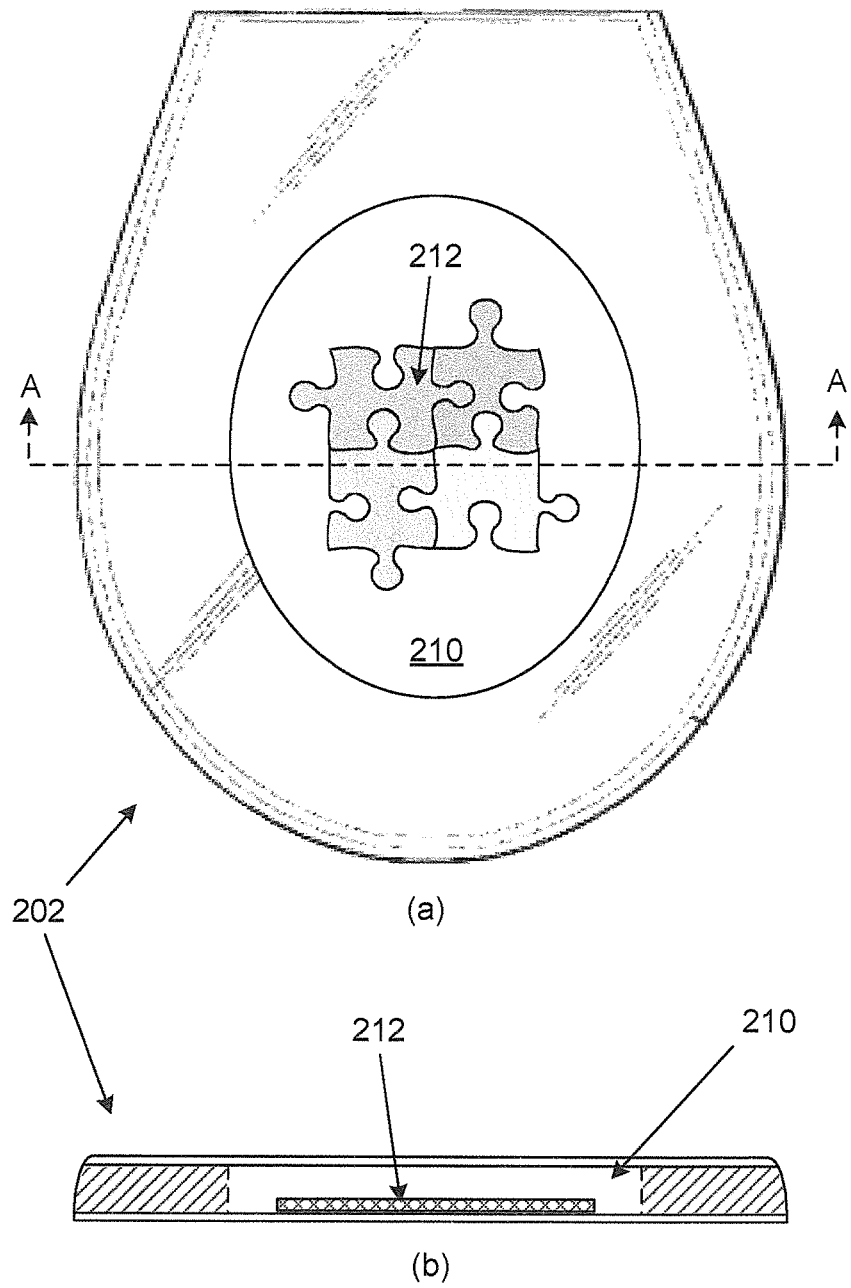
FIG. 2 illustrates a top plan view and a cross sectional view of a laminar toilet lid, according to one embodiment of the present disclosure.

FIG. 2 illustrates a top plan view and a cross sectional view of a laminar toilet lid, according to one embodiment of the present disclosure. The embodiment of the toilet lid 202 shown in FIG. 2 is for illustration only. Other embodiments of the toilet lid 202 could be used without departing from the scope of this disclosure. For ease of explanation, the toilet lid 202 may represent the toilet lid 102 of FIG. 1. It will be understood, however, that the toilet lid 202 may represent any other similarly arranged toilet lid.

As shown in FIG. 2(a), the toilet lid 202 includes a cavity 210. One or more aesthetic or decorative objects (represented by decorative object 212) are disposed inside the cavity 210. The decorative object 212 may represent any picture, graphic, toy, or any other suitable object, and may be chosen to appeal to a user of a toilet where the toilet lid 202 is installed.

In certain embodiments, the decorative object 212 may be chosen to match or coordinate with a particular decorative scheme of a bathroom or restroom where the toilet is installed. For example, the decorative object 212 may be one or more sea shells in a beach-themed or nautical-themed bathroom. In other embodiments, the decorative object 212 may be an acrylic block embedded with a logo or trademark of a business. In still other embodiments, the decorative object 212 may be chosen to reflect an interest or hobby of a homeowner, such as sports memorabilia or a favorite souvenir. The decorative object 212 is integrated into the laminar composition of the toilet lid 202, as explained in greater detail below. Thus, the decorative object 212 is protected from degradation and wear.

FIG. 2(b) shows a cross sectional view of the toilet lid 202 taken along the line A-A of FIG. 2(a). The cavity 210 is enclosed within top and bottom layers of the toilet lid 202 and vertical walls of the cavity 210. The top layer may be clear to allow the decorative object 212 to be viewed. Although the vertical walls are depicted in FIG. 2(b) as straight, the vertical walls may also be curved.

As shown in FIG. 2(b), the decorative object 212 is disposed in the cavity 210 and rests on the bottom layer of the toilet lid 202. In other embodiments, the decorative object 212 may be secured in an elevated position in the cavity 210 so as to appear "floating" above the bottom layer of the toilet lid 202. The decorative object 212 may be placed anywhere within the limits of the cavity 210, and may be secured to any one or more of the boundaries of the cavity 210 using any suitable means. In one embodiment, the decorative object 212 may be secured to the bottom layer of the toilet lid 202 with an adhesive or one or more fasteners. In another embodiment, the decorative object 212 may be secured to one or more vertical walls of the cavity 210. In yet another embodiment, the decorative object 212 may be embedded in a fluid, such as a resin, that substantially fills the cavity 210 and hardens into a solid.

Although FIG. 2 depicts one example of a laminar toilet lid 202, various changes may be made to FIG. 2. For example, while the decorative object 212 is shown as one contiguous object, the decorative object 212 may include multiple separate objects that are spaced apart and individually secured within the cavity 210. As another example, the decorative object 212 may be unsecured such that the decorative object 212 is able to freely move within the cavity 210.

Figure 3:
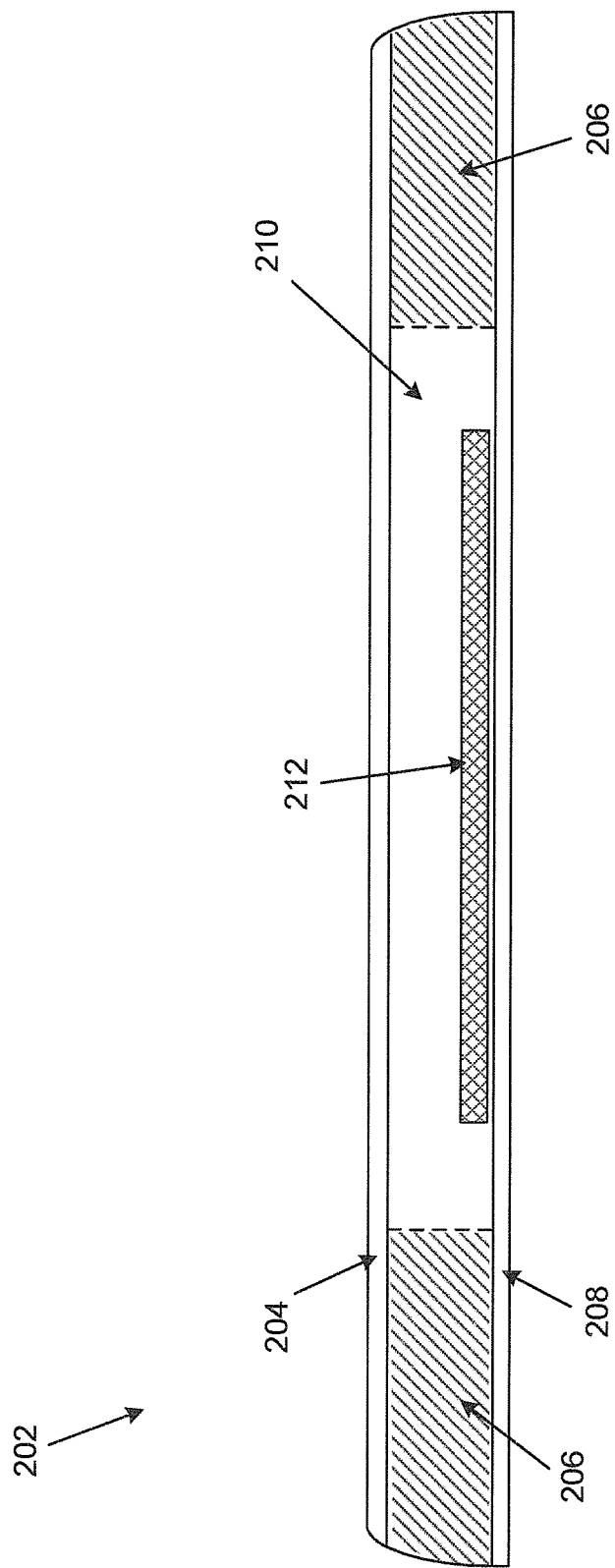
FIG. 3 illustrates a larger cross-sectional view of the laminar toilet lid of FIG. 2.

FIG. 3 illustrates a larger cross-sectional view of the laminar toilet lid 202 taken along the line A-A of FIG. 2(a). The toilet lid 202 comprises three layers 204, 206, and 208. For clarity of illustration, the thickness of each layer 204, 206, 208 may not be drawn to scale. Layer 204 is a top exterior finish layer. Layer 206 is a core structural layer having an aperture that defines the cavity 210. Layer 208 is a bottom exterior finish layer. As shown in FIG. 3, the layers 204, 208 are substantially planar and parallel such that the layers 204, 208 do not make contact with each other. In some embodiments, such as the embodiment shown in FIG. 3, at least two of the edges of the layers 204, 206, 208 (e.g., the edges of the layers 204, 206) together form a contoured, non-planar edge of the toilet lid 202.

In accordance with the present disclosure, the top exterior finish layer 204 may be formed of polymethylmethacrylate (PMMA). PMMA is a transparent, thermoplastic material that is very durable and exhibits excellent optical properties. PMMA is also scratch resistant, can be CNC (computer numerical control) machined, and is more impact resistant than ordinary glass. PMMA is also known by its trade names Plexiglas™ and Lucite™. The thickness of the top exterior finish layer 204 may be selected according to the requirements of the application. In one embodiment, the thickness of the top layer 204 is approximately one to two millimeters (1 mm-2 mm). While the top layer 204 is described as PMMA, the top layer 204 may be formed of another special function glass or any other suitable material that exhibits the advantageous properties of PMMA.

In some embodiments, the top exterior finish layer 204 is clear and colorless. However, the top layer 204 is not limited thereto. For example, the top layer 204 may be colored, tinted and/or mirrored. Additionally, the top layer 204 may be smooth or textured, and have a glossy or matte finish.

The core layer 206 may be formed of a medium density fiberboard (MDF). As is known in the art, MDF is formed of wood fibers that are held together with one or more waxes or resins such as epoxies, formaldehyde resins, or phenolic resins. The fiber content and thickness of the MDF core layer 206 may vary based on application requirements. The core layer 206 accounts for the majority of the thickness of the toilet lid 202 and provides most of the rigidity of the toilet lid 202. In one embodiment, the thickness of the core layer 206 is approximately twenty millimeters (20 mm). In an embodiment, one or both sides of the core layer 206 are painted or coated to hide or protect the finish of the MDF material.

Although the core layer 206 is described as being formed of MDF, other materials may be used. For example, the core layer 206 may be formed of another composite wood, such as hardwood plywood (HWPW), particleboard (PB), high density fiber board (HDF), molded wood, or any other suitable material. In an embodiment, the core layer 206 may be formed of two or more sub-layers, each sub-layer comprising one of the materials described above.

In one embodiment, the bottom exterior finish layer 208 may be formed of the same material as the top exterior finish layer 204. For example, the bottom exterior finish layer 208 may be formed of PMMA. When the top layer 204 and bottom layer 208 are both formed of a transparent material, such as PMMA, a line of sight into the toilet bowl 106 is provided, even when the toilet lid 202 is in a lowered position. In another embodiment, the bottom layer 208 may be formed of an opaque material (e.g., MDF or an opaque plastic) that hides the toilet bowl 106 when the toilet lid 202 is in a lowered position. The bottom layer 208, along with the top layer 204 and the walls of the aperture in the core layer 206, define and enclose the cavity, thus protecting the decorative object 212 from wear or damage.

Figure 4:
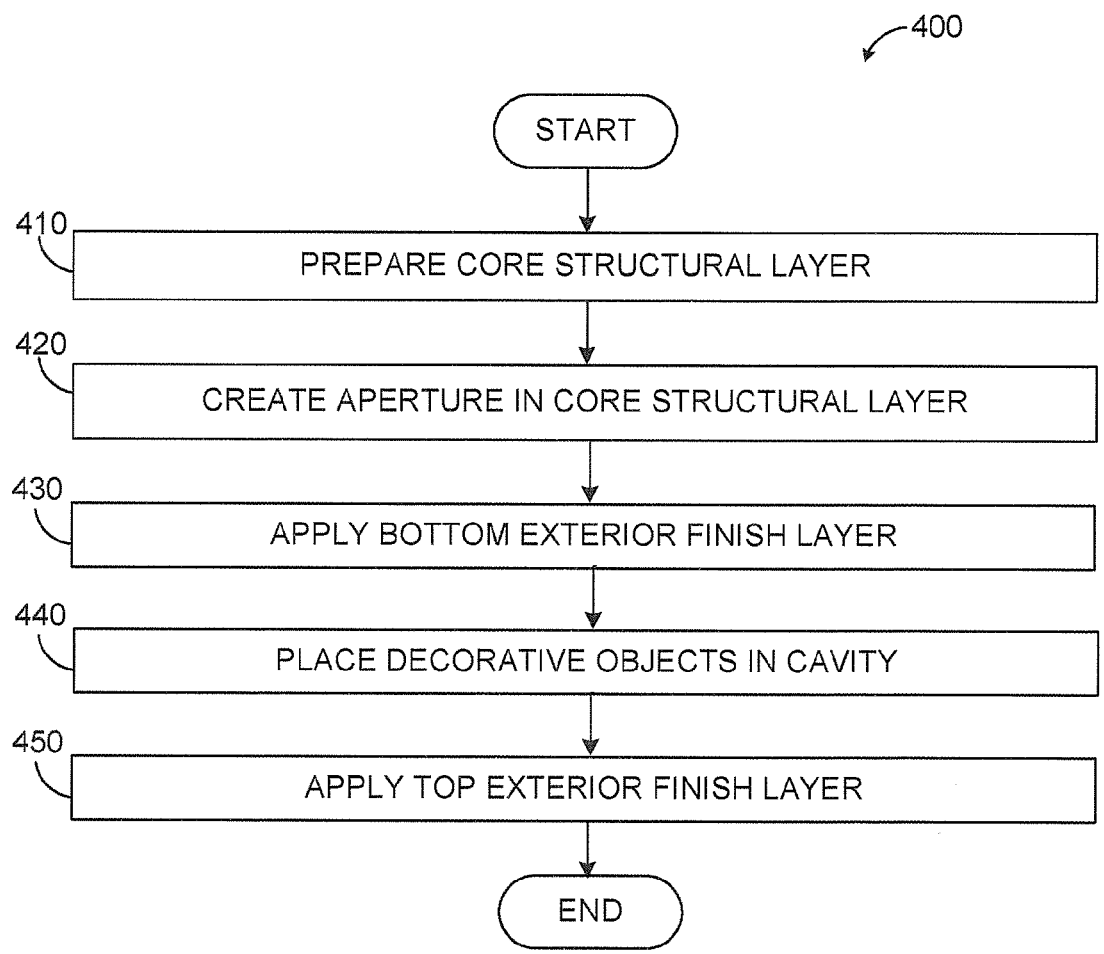
FIG. 4 depicts a method for manufacturing a laminar composite toilet lid, according to one embodiment of the present disclosure.

FIG. 4 depicts a method for manufacturing a laminar composite toilet lid (e.g., toilet lid 202), according to one embodiment of the present disclosure. The method shown in FIG. 4 is for illustration only. Other embodiments of the method could be used without departing from the scope of this disclosure.

First, a core structural layer (e.g., layer 206) is prepared having a size and shape suitable for its application (step 410). Preparation of the core structural layer may include painting one or more surfaces of the core structural layer. Next, an aperture is formed in the core structural layer (step 420). The edges or walls of the aperture are shaped and finished according to the chosen application. For example, the aperture walls may be beveled, curved, painted, coated, or otherwise finished using methods known in the art.

Next, a bottom exterior finish layer (e.g., layer 208) is applied to a bottom surface of the core structural layer (step 430). The bottom exterior finish layer is attached to the core structural layer with an adhesive, one or more fasteners, or any other suitable means for attaching adjoining materials.

Next, one or more decorative objects are placed in the cavity formed by the aperture and the bottom exterior finish layer (step 440). The objects may be arranged and secured, or left unsecured. In an embodiment, a transparent fluid may be injected or poured into the cavity and around the decorative objects, and allowed to cure and harden, thus securing the objects in place.

Next, a top exterior finish layer (e.g., layer 204) is applied to the top surface of the core structural layer (step 450). The top exterior finish layer is attached to the core structural layer with an adhesive, one or more fasteners, or any other suitable means for attaching adjoining materials.

The seams between the adjoining layers may be finished according to known techniques in order to create a smooth transition. Once the exterior finish layers are completely applied, the exterior finish layers envelop the cavity and provide protection to the decorative objects while allowing the decorative objects to be seen from one or both sides.

Although FIG. 4 illustrates one example of a method for manufacturing a laminar composite toilet lid, various changes may be made to FIG. 4. For example, while shown as a series of steps, various steps in FIG. 4 may overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A toilet lid, consisting of:
    a core structural layer having a shape and size associated with the toilet lid, the core structural layer having first and second surfaces opposite each other and substantially the same shape and size as the toilet lid, the core structural layer having one or more walls defining an aperture through a middle portion, the one or more aperture walls having a painted finish;
    a planar first exterior layer disposed on the first surface of the core structural layer and configured to cover the aperture, the first exterior layer covering substantially all of the first surface of the core structural layer, the first exterior layer having a contoured edge that follows a contoured edge of the toilet lid;
    a planar second exterior layer disposed on the second surface of the core structural layer opposite the first exterior layer, the second exterior layer configured to cover the aperture such that the first and second exterior layers enclose the aperture to form a cavity, the second exterior layer covering substantially all of the second surface of the core structural layer, the second exterior layer having an edge that follows the contoured edge of the toilet lid; and
    at least one aesthetic object disposed within the cavity, wherein the first exterior layer and the second exterior layer are parallel such that the second exterior layer does not make direct contact with the first exterior layer.

2. The toilet lid of claim 1, wherein the core structural layer comprises medium density fiberboard (MDF) and the first and second exterior layers comprise polymethyl-methacrylate (PMMA).

3. The toilet lid of claim 1, wherein the core structural layer comprises medium density fiberboard (MDF).

4. The toilet lid of claim 1, wherein the first exterior layer comprises polymethyl-methacrylate (PMMA).

5. The toilet lid of claim 4, wherein the second exterior layer comprises polymethyl-methacrylate (PMMA).

6. The toilet lid of claim 2, wherein the at least one aesthetic object is secured to one of the first and second exterior layers.

7. The toilet lid of claim 2, wherein the at least one aesthetic object is embedded in a hardened fluid that substantially fills the cavity.

8. A toilet lid assembly, comprising:
    a toilet lid; and
    a toilet seat connected to the toilet lid by hinged hardware, wherein the toilet lid consists of:
        a core structural layer having a shape and size associated with the toilet lid, the core structural layer having first and second surfaces opposite each other and substantially the same shape and size as the toilet lid, the core structural layer having one or more walls defining an aperture through a middle portion, the one or more aperture walls having a painted finish;
        a planar first exterior layer disposed on the first surface of the core structural layer and configured to cover the aperture, the first exterior layer covering substantially all of the first surface of the core structural layer, the first exterior layer having a contoured edge that follows a contoured edge of the toilet lid;
        a planar second exterior layer disposed on the second surface of the core structural layer opposite the first exterior layer, the second exterior layer configured to cover the aperture such that the first and second exterior layers enclose the aperture to form a cavity, the second exterior layer covering substantially all of the second surface of the core structural layer, the second exterior layer having an edge that follows the contoured edge of the toilet lid; and
        at least one aesthetic object disposed within the cavity, wherein the first exterior layer and the second exterior layer are parallel such that the second exterior layer does not make direct contact with the first exterior layer.

9. The toilet lid assembly of claim 8, wherein the core structural layer comprises medium density fiberboard (MDF) and the first and second exterior layers comprise polymethyl-methacrylate (PMMA).

10. The toilet lid assembly of claim 8, wherein the core structural layer comprises medium density fiberboard (MDF).

11. The toilet lid assembly of claim 8, wherein the first exterior layer comprises polymethyl-methacrylate (PMMA).

12. The toilet lid assembly of claim 11, wherein the second exterior layer comprises polymethyl-methacrylate (PMMA).

13. The toilet lid assembly of claim 9, wherein the at least one aesthetic object is secured to one of the first and second exterior layers.

14. The toilet lid assembly of claim 9, wherein the at least one aesthetic object is embedded in a hardened fluid that substantially fills the cavity.

* * * * *